Jan. 28, 1930. J. B. MURRAY ET AL Re. 17,574

WELDING SEGMENTS OF HOLLOW ARTICLES

Original Filed July 24, 1923

Inventors
Joseph B. Murray
Thomas E. Murray Jr.
By their Attorney
R. Anthony Alina Reissued Jan. 28, 1930

Re. 17,574

UNITED STATES PATENT OFFICE

JOSEPH B. MURRAY AND THOMAS E. MURRAY, JR., OF BROOKLYN, NEW YORK

WELDING SEGMENTS OF HOLLOW ARTICLES

Original No. 1,492,258, dated April 29, 1924, Serial No. 653,452, filed July 24, 1923. Application for reissue filed December 1, 1925. Serial No. 72,605.

In previous patents of ourselves and others there is described the making of rear axle housings for automobiles and similar hollow or tubular products by welding together the edges of sheet metal segments of approximate shape. The invention provides methods and devices applicable to such operations. The accompaniyng drawings illustrate an embodiment of the invention in which—

Figure 1:
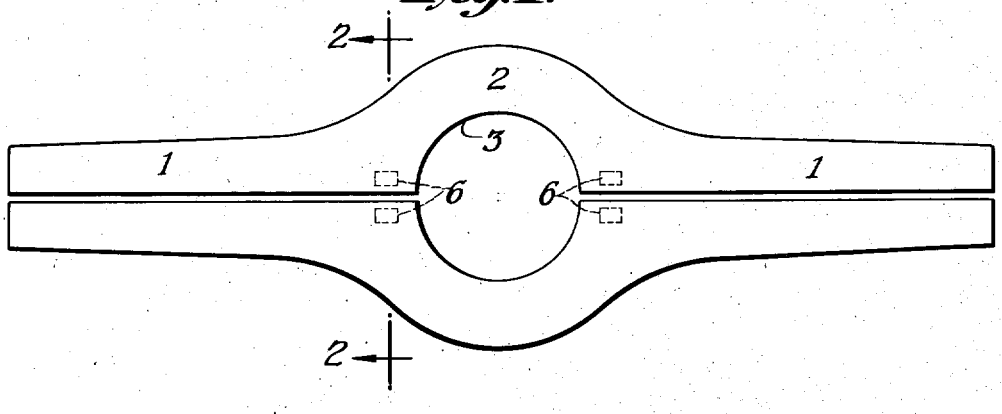
Fig. 1 is a side elevation of two segments of a rear axle housing.
Figure 2:
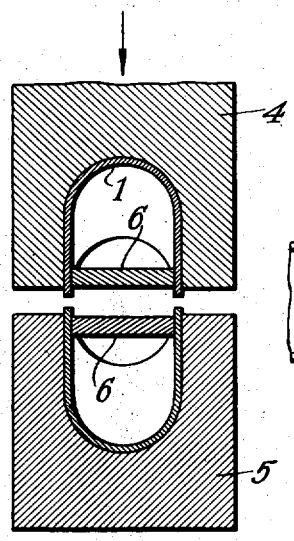
Fig. 2 is a section of the same on the line 2—2 of Fig. 1, with the electrodes and certain inserted blocks in position for welding the parts together.
Figure 3:
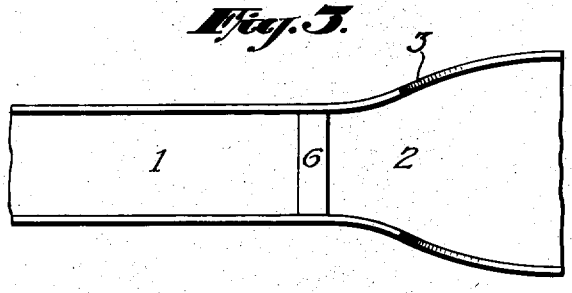
Fig. 3 is a plan view of a fragment of one of the segments.

Each of the segments comprises end portions 1 and a central enlarged portion 2 cut out at the edges 3 to form a transverse opening through the finished housing. The end portions 1 are of substantially uniform width throughout their length, flaring at the center as indicated in Fig. 3, and are of gradually increasing depth as shown in Fig. 1. Housings are made in various other shapes and proportions, and it will be understood that the invention is not limited to the particular design shown.

The segments are welded to each other along their edges by forcing such edges together between opposite electrodes 4 and 5 and passing a welding current across the joint. Preferably the operation is carried out as described in the Reissue Patent No. 15,466 of October 10th, 1922, granted to Thomas E. Murray, Jr., by the passage of currents of extraordinarily high amperage continuing for a very small period of time, generally a fraction of a second. In this operation, particularly, and to some extent in other electric welding operations, it is difficult to secure a perfect register of the edges tc be joined and to maintain such register during the entire welding operation.

In a patent of Murray and Murray No. 1,420,735 of June 27th, 1922, an apparatus is described for taking care of a similar difficulty in the case of welding edges of sheet metal segments. But the specific apparatus there illustrated is not conveniently applicable to the making of such an axle housing as is indicated herein except for holding the ends of the segments in position. The intermediate parts, as along the section line 2—2 and adjacent thereto, are larger than the ends of the blanks and are therefore not readily accessible through such ends. But these intermediate parts of the blanks are deeper than the end portions and the vibration at the edges and the difficulty in maintaining registration are greater than at the ends.

We propose to meet the difficulty by holding the edges properly spaced apart at points adjacent to the central portion of the housing by any suitable holding means located between the edges at said points and separate from the electrodes; that is, disconnected therefrom.

Figure 4:
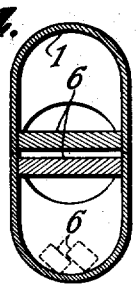
Fig. 4 is a section on the same plane as Fig. 2 showing the segments welded.

In the specific case illustrated a temporary holding means is provided comprising wedges or blocks 6 which serve to press the edges of the segments out against the walls of the embracing electrodes and to hold such edges stiff and in accurate registration during the butt welding operation. These are simple blocks of steel or other suitable material preferably slightly tapering so that, the segments being placed in the electrodes, the blocks can be driven in the position shown. Or they may be set in place before the segments are located in the electrodes. They are easily introduced while the segments are separated through the open edges thereof. They may be placed at any one or more points along the length of the segments. The weakness is greatest at the ends of the straight edges and particularly at the inner ends near the transverse opening 3, and it will generally be sufficient to insert the blocks near such edges. After the welding operation the blocks can be driven out with a rod or similar tool. Their length is just sufficient for the purpose described, and their width and thickness are such that when they are dislodged and fall lengthwise into the tubular structure they can be readily withdrawn therefrom either through the central opening or through the ends. That is, their cross-sectional dimensions are less than those of the interior of the axle housing or other product manufactured. For example, when dislodged, they will fall to the bottom of the tubular structure as indicated in dotted lines in Fig. 4.

Though we have described with great particularity of detail a certain specific embodiment of our invention, yet it is not to be understood therefrom that the invention is restricted to the particular embodiment disclosed. Various modifications thereof in detail and in the arrangement of the parts may be made by those skilled in the art without departure from the invention as defined in the following claims.

What we claim is:—

1. The combination with electrodes adapted to embrace sheet metal segments of separate blocks adapted to be introduced at desired points in the length of the segments to press the sides outward against the electrodes and to hold the edges rigidly during the welding operation, said blocks being of a length to span the space between the sides and being of less width so that when released and turned they may be removed easily.

2. The method of making an axle housing with tubular end portions and a central enlarged portion which consists in forming segments thereof of sheet metal and pressing said segments together at the edges between electrodes bearing against the outer faces of the segments while holding said edges properly spaced apart at points adjacent to the central portion by means shorter than the joints and located between the edges at said points and separate from the electrodes and passing a welding current between the segments.

3. In the butt welding of the edges of sheet metal segments to make a hollow article of varying cross-section, the method of holding such a segment rigidly in place at or near the points of greater cross-section which consists in holding said edges properly spaced apart at such points by means shorter than the joint and located between the edges at said points.

In witness whereof, we have hereunto signed our names.

JOSEPH B. MURRAY.
THOMAS E. MURRAY, Jr.